United States Patent
Armbruster et al.

(10) Patent No.: US 8,360,764 B2
(45) Date of Patent: Jan. 29, 2013

(54) TRANSFER SYSTEM FOR MULTICOMPONENT INJECTION MOLDING

(75) Inventors: Rainer Armbruster, Wolfach (DE); Roger Kirchhofer, Reitnau (CH); Peter Zurfluh, Alpnach-Dorf (CH)

(73) Assignees: Foboha GmbH Formenbau, Haslach (DE); Trisa Holding AG, Triengen (CH)

( * ) Notice: Subject to any disclaimer, the term of this patent is extended or adjusted under 35 U.S.C. 154(b) by 479 days.

(21) Appl. No.: 12/223,090

(22) PCT Filed: Nov. 14, 2006

(86) PCT No.: PCT/CH2006/000640
§ 371 (c)(1),
(2), (4) Date: Oct. 6, 2009

(87) PCT Pub. No.: WO2007/082394
PCT Pub. Date: Jul. 26, 2007

(65) Prior Publication Data
US 2010/0276836 A1    Nov. 4, 2010

(30) Foreign Application Priority Data

Jan. 23, 2006   (CH) .................................. 106/06

(51) Int. Cl.
*B29C 45/16* (2006.01)
(52) U.S. Cl. ...................... 425/112; 264/255; 264/297.2

(58) Field of Classification Search ................... 264/255, 264/297.2; 425/112
See application file for complete search history.

(56) References Cited

U.S. PATENT DOCUMENTS

| 4,427,359 | A | * | 1/1984 | Fukuoka et al. ............... 425/525 |
| 6,783,346 | B2 | | 8/2004 | Bodmer et al. |
| 2006/0153947 | A1 | | 7/2006 | Shakal et al. |
| 2006/0244178 | A1 | * | 11/2006 | Armbruster ................... 264/255 |

FOREIGN PATENT DOCUMENTS

| DE | 101 21 691 A1 | 7/2002 |
| EP | 0 504 571 A2 | 9/1992 |
| EP | 0 903 213 A2 | 3/1999 |
| EP | 1 155 802 | 11/2001 |
| EP | 1 174 242 A1 | 1/2002 |
| EP | 1 782 936 A2 | 9/2007 |

OTHER PUBLICATIONS

Zahoransky Group: "3K Spritzmontagewerkzeug" Internet Video, Dec. 19, 2005 http://www.zahoransky.com/files/zfb_video_dsl/spritzmontage.wmv.

* cited by examiner

*Primary Examiner* — Jill Heitbrink
(74) *Attorney, Agent, or Firm* — Pauley Petersen & Erickson

(57) ABSTRACT

The invention relates to a method and a device for producing parts that are made up of more than one component. The first part (17) is produced in a first plane (10) and then transported by a transfer system (15) into a second plane (11).

10 Claims, 3 Drawing Sheets

TRANSFER SYSTEM FOR MULTICOMPONENT INJECTION MOLDING

BACKGROUND OF THE INVENTION

Field of the Invention

The invention lies in the field of injection molding technology, in particular of multicomponent injection molding technology for plastic.

SUMMARY OF THE INVENTION

Apparatuses for multicomponent injection molding are known from the prior art.

EP1155802, by the same applicant, shows an apparatus for securing central parts in multicomponent injection molds, which central parts are displaceable relative to one another such that a cube-shaped central part can easily be exchanged.

U.S. Pat. No. 6,783,346, likewise by the same applicant, shows an apparatus for producing articles which are composed of a plurality of plastics. The apparatus has a rotatable, cube-shaped central part. The cube-shaped central part comprises a transfer system by means of which an intermediate product is brought from a first cavity into a further cavity on the same level of the central part such that, for example, it can be encapsulated with a further material component by injection molding.

An object of the invention is to provide a method and an apparatus by means of which products, in particular products which are composed of a plurality of plastic components, can be produced more efficiently.

The object is achieved by the method defined in the patent claims and the apparatus proposed for carrying out the method.

To achieve the object, a method is proposed, in which a part/product is produced on a first processing level of an injection molding apparatus in order then to be brought from the first processing level onto a second processing level by means of a transfer system integrated in the apparatus. On the second processing level, the product is subjected to a further processing step, for example by being operatively connected to a further material.

The first processing level is formed by a fixed first mold part (mold half) and a second mold part (mold half) which is movable in a translatory manner in a first direction. The second processing level is formed by the second mold part (mold half) and a third mold part (mold half) which is movable in a translatory manner in the first direction. In a preferred embodiment, the second mold half is of substantially cuboidal design and has cavities on at least two opposite sides. If required, the second mold half is arranged rotatably. Depending on the embodiment, the movable mold halves (second and third mold halves) are supported or mounted by means of retaining means on the struts of an injection molding machine, which struts serve as a linear guide. The retaining means can be designed such that they are removable in a manner such that they permit easy use and disassembly of the injection molding apparatus. In a preferred embodiment, the retaining means engage around the struts from above in the manner of a half shell or rest thereon.

During the transportation of the product from the first processing level onto the second processing level, the product is preferably rotated about an axis of rotation substantially perpendicular to the first direction. If required, the product is freed before the rotation such that it does not collide during the rotation. In one embodiment of the apparatus, the axis of rotation runs substantially through the center of a cuboidal central part.

In contrast to the apparatuses known from the prior art, instead of a rotatable, central mold half, one embodiment of the apparatus has a transfer system which is suitable for bringing parts from the first processing level onto the second processing level by moving said parts around the central mold half. For this purpose, the transfer system is designed in such a manner that it first of all frees the parts on the first processing level to an extent such that said parts can be transported without a risk of collision into the second processing level. For this, the transfer system has a length which can be changed radially with respect to the axis of rotation such that parts manufactured on the first processing level can be lifted out of or freed from the cavities. After rotation onto the second processing level, the parts from the first processing level are placed into cavities of the second processing level where they are subsequently subjected to a further processing step. If required, the transfer system is designed in such a manner that, during the transportation from the first onto the second processing level, the parts are rotated through 90° or 180° about at least one further axis.

The transfer system is preferably part of the apparatus according to the invention, for example by being integrated into the central mold half. In one embodiment, the transfer system is arranged rotatably about an axis of rotation substantially perpendicular to the direction of movement of the central mold half.

Depending on the embodiment, the transfer system has a plurality of cantilevers which are rotatable about the axis of rotation and are arranged at radial distances from one another. The cantilevers generally have at least one retaining means which serves to secure the parts during the transportation from the first onto a further processing level. The cantilevers are preferably designed such that they can be adjusted in the radial direction such that they permit a radial displacement of the parts combined with the rotational movement. The cantilevers of the transfer system can be configured in such a manner that they form at least one region of a cavity.

The transfer system can be designed in such a manner that, after the transportation, the parts are alternatively placed into cavities of the second mold half and/or of the third mold half. This is obtained, for example, by means of a transfer system which, in addition to a translatory and a rotatory degree of freedom, has at least one further translatory and/or at least one further rotatory degree of freedom.

One advantage of the invention is that, in contrast to a cube system, the number of cavities can be reduced or simplified. A further advantage is that better cooling is achieved by freeing the component.

By means of the invention, for example, brushes, in particular toothbrushes which are composed of a plurality of material components, can be produced particularly efficiently. The products can differ from conventionally produced products by way of the characteristic parting line of the injection mold.

BRIEF DESCRIPTION OF THE DRAWINGS

The invention is explained in more detail with reference to the embodiments shown in the following figures, in which.

DETAILED DESCRIPTION OF THE INVENTION

The reference numbers of corresponding parts are identical in all of the figures.

Figure 5:
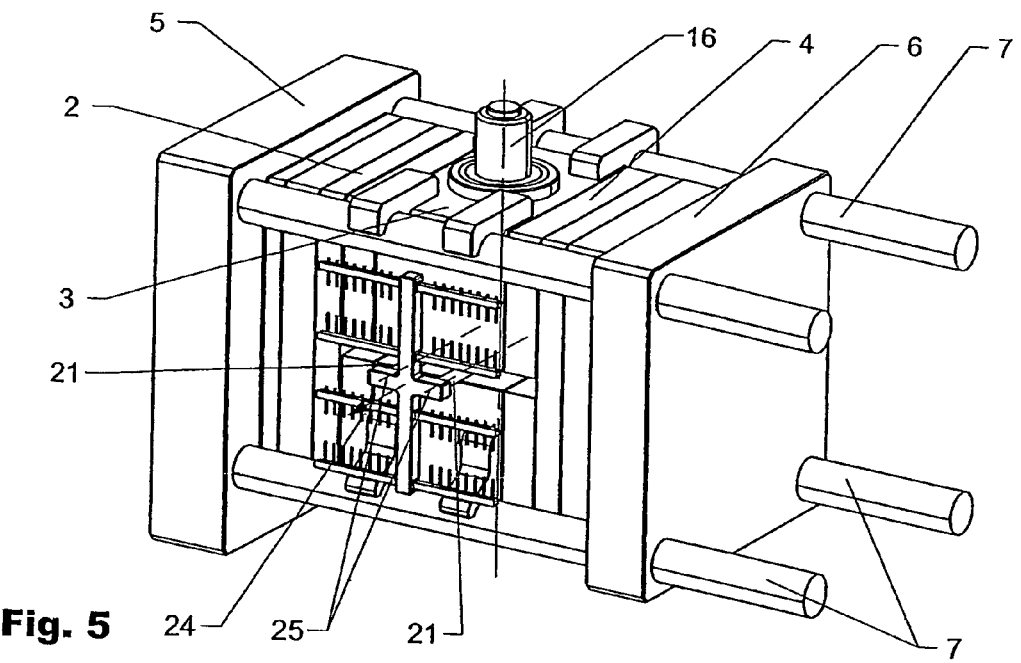
FIG. 5 shows the apparatus from FIG. 1 in a closed position, in a perspective view.
Figure 6:
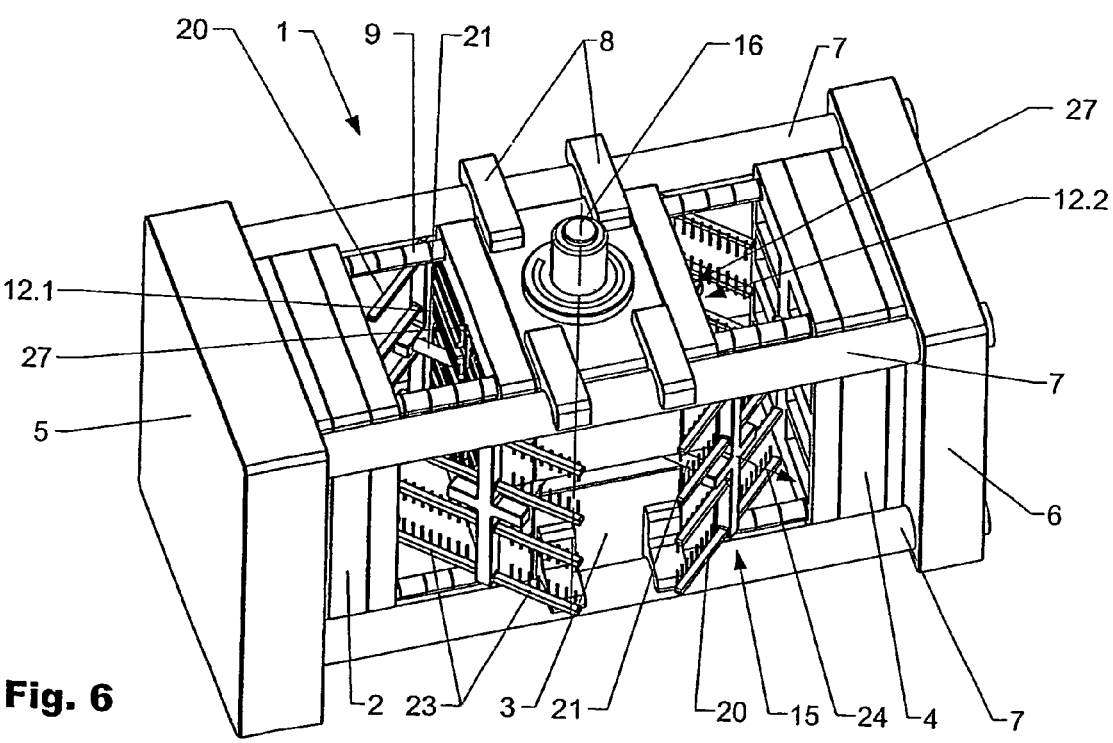
FIG. 6 shows the apparatus from FIG. 1 in an open position with a partially rotated transfer system, in a perspective view.

FIGS. 1 to 6 show an embodiment of an apparatus 1 for carrying out the method according to the invention. FIGS. 1 to 4 show the apparatus 1 in an open position, and FIG. 5 shows the apparatus 1 in a closed position. FIG. 6 shows the apparatus 1 in an open position and with a transfer system 15 partially rotated.

The apparatus 1 has a fixed first mold half 2, a third mold half 4 which is movable in a first direction (x direction), and a second mold half 3 which is likewise movable in the first direction and is arranged between the first and the third mold halves. In the embodiment shown, the second mold half 3 is of cuboidal design and has cavities 12 on two opposite sides, said cavities interacting with corresponding cavities 13 of the first and of the third mold halves 2, 4.

The first mold half 2 is fastened here to a fixed, first machine plate 5 and the third mold half is fastened to a movable second machine plate 6 of an injection molding machine (not illustrated specifically). The movable second machine plate 6 is mounted in a linearly displaceable manner along struts 7 (x direction) of the injection molding machine. In the embodiment shown, the second mold half 3 has retaining means 8 serving for the supporting on the struts 7. The retaining means 8 serve as linear bearings, by means of which the second mold half is displaceable along the struts 7, and are designed in such a manner that the apparatus 1 can easily be removed from the injection molding machine. A coordination means 9 ensures that, during the opening and closing of the apparatus 1, the central mold half 3 is always located approximately in the center between the first and the third mold halves 2, 4. Correspondingly arranged spindles or hydraulic drives are suitable as the coordination means.

A first processing level 10 is located between the first and the second mold halves 2, 3, and a second processing level 11 is located between the second and the third mold halves 3, 4.

The central mold half 3 has a transfer system 15 which serves to transport parts 17 from the first processing level 10 onto the second processing level 11. The transfer system 15 is arranged rotatably about an axis of rotation 16 (z direction) and has cantilevers 20 which serve for the temporary securing and for the transport of the parts 17 from the first processing level 10 onto the second processing level 11. The cantilevers 20 are fastened to cantilever arms 21 which are arranged substantially perpendicularly to the axis of rotation 16. A radial length (cf. FIG. 6, arrow 24) of the cantilever arms 21 can be adjusted such that the radial distance of the cantilevers 20 from the axis of rotation 16 can be adjusted. By means of this radial adjustability, it is possible, after the processing levels 10, 11 of the apparatus 1 are opened, for a part 17 to be lifted out of a first cavity 12.1 of the first processing level 10 (cf. FIG. 6) and to be brought into a position in which it can be rotated about the axis of rotation 16 by means of the cantilever 20 and can be brought into a position above a further cavity 12.2 (cf. FIG. 6) of the second processing level 11. By shortening of the radial length of the cantilever arm, the part is placed into the further cavity where it is subjected to a further machining step after the apparatus 1 is closed. In one embodiment, the cantilever arms 21 can be adjusted telescopically.

The apparatus 1 shown has four cantilevers 20 which are attached to four cantilever arms 21 arranged in a star-shaped manner and at a distance of 90° with respect to one another. The cantilever arms 21 in turn here comprise two telescopic rods 22 which, depending on the field of use, can be adjusted hydraulically, mechanically or electrically. The arrangement of the telescopic rods is illustrated schematically in FIG. 5 by means of lines 25.

Figure 2:
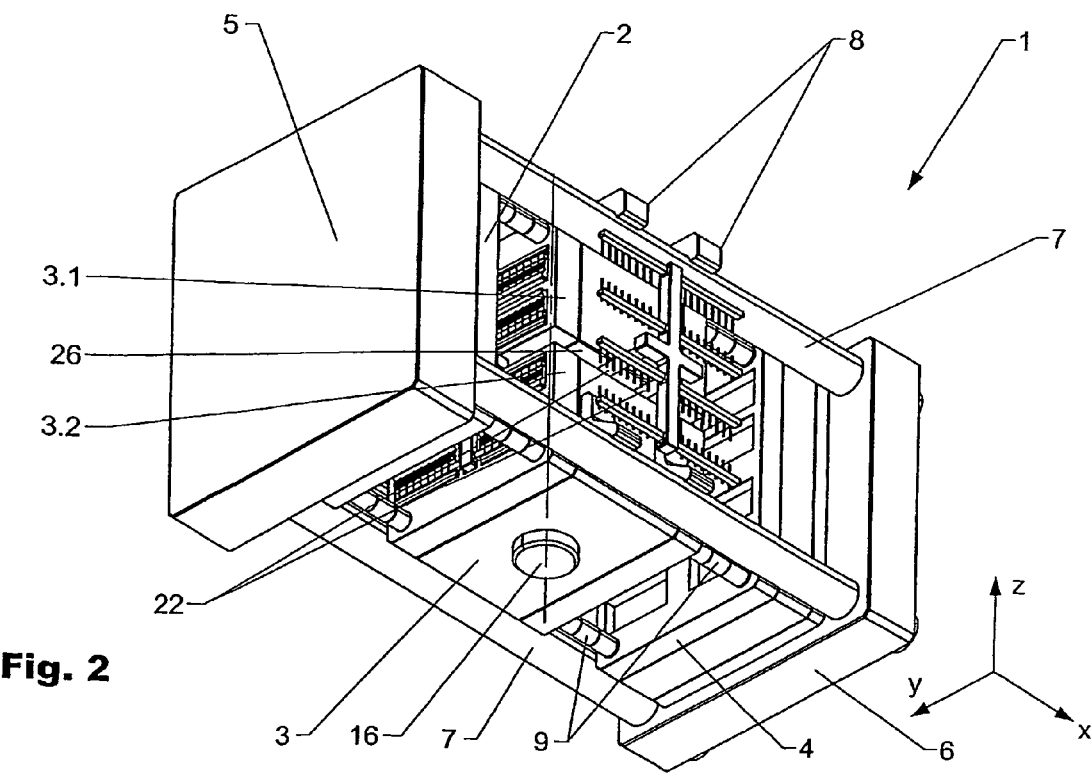
FIG. 2 shows the apparatus according to FIG. 1 in a perspective view obliquely from the bottom.
Figure 3:
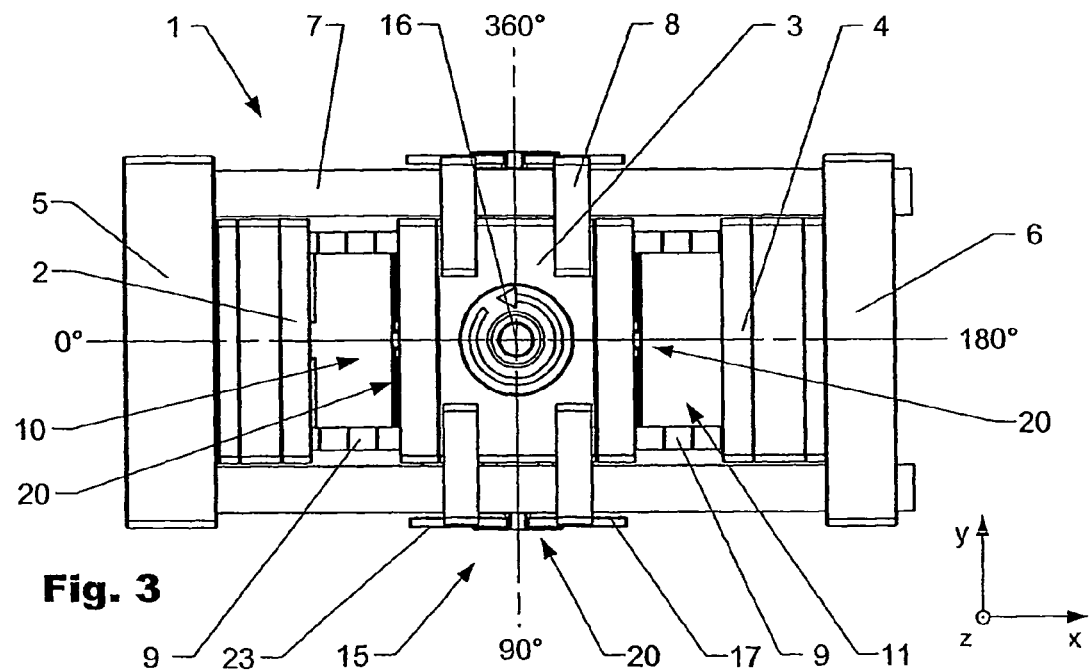
FIG. 3 shows the apparatus according to FIG. 1 in a top view.
Figure 4:
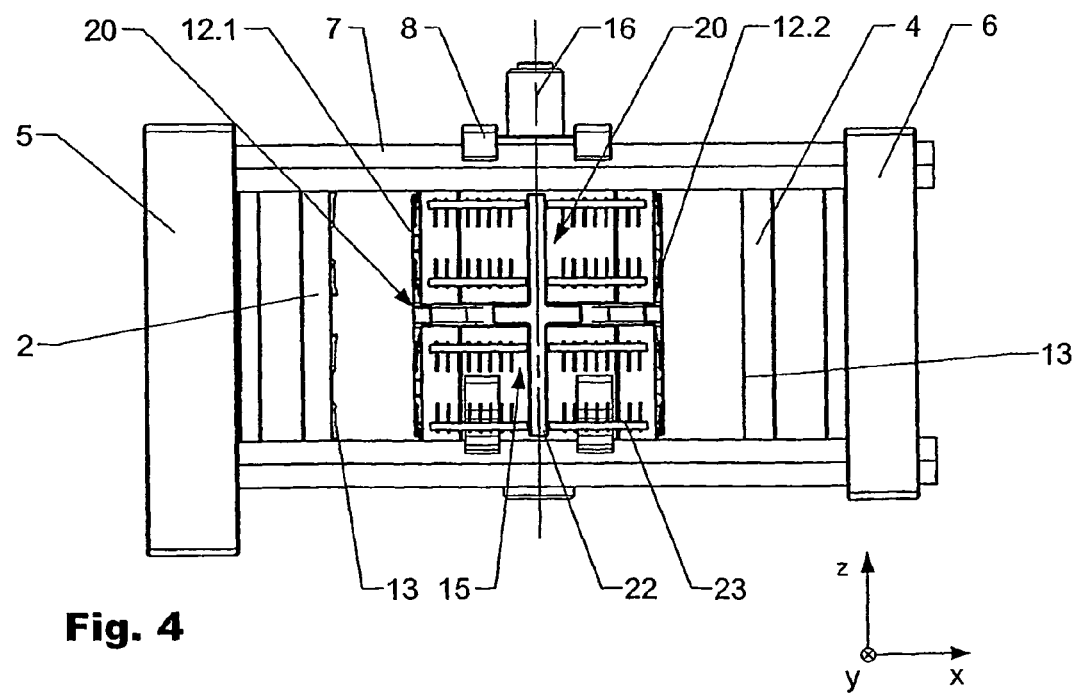
FIG. 4 shows the apparatus according to FIG. 1 in a side view.

As emerges, inter alia, from FIG. 2, the telescopic rods 22 are arranged in the vertical direction (z direction) in such a manner that the cuboidal central part 3 is divided into a lower and an upper half 3.1, 3.2. The telescopic rods 22 are arranged in a radial, slot-shaped opening 26 and are mounted in the interior of the central mold part 3 in a manner free from rotation.

Figure 1:
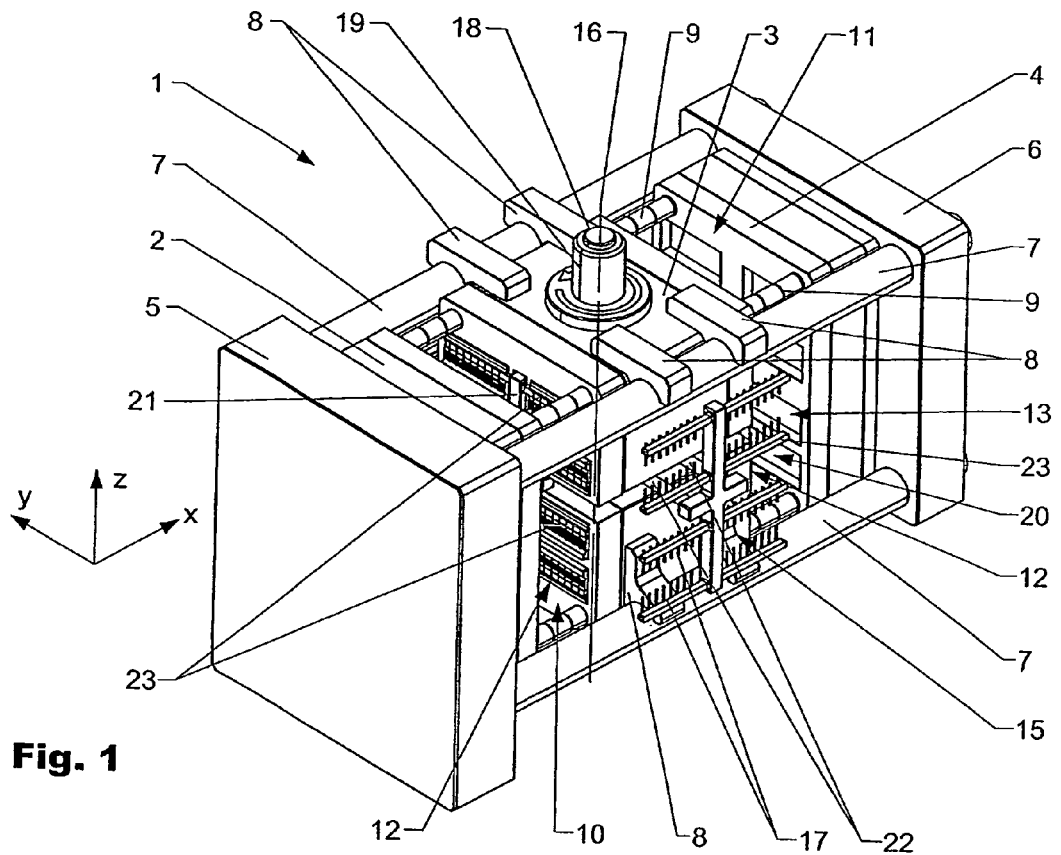
FIG. 1 shows a first embodiment of an apparatus according to the invention in an open position, in a perspective view obliquely from above.

As can be seen, inter alia, in FIG. 1, the cantilevers 20 have retaining means 23 which engage in cavities 12, 13 of the first processing level 10, or form a region of the cavities 12. The retaining means 23 are designed in such a manner that the parts 17, which are formed, for example, by injection of plastic into the cavities 12, 13, temporarily stick to the retaining means 23 such that they can be transported from the first processing level 10 onto the second processing level 11. Depending on the configuration, the retaining means 23 can bring about characteristic parting lines on the produced parts in the region of interaction, with reference to which the products can be identified.

In the embodiment shown, the transfer system 15 rotates in the counterclockwise direction about the axis of rotation 16. After the injection molding apparatus 1 is opened, parts 17 which have been produced on the first processing level 10 are transported from the first processing level 10 onto the second processing level 11 by means of the cantilevers 20 of the transfer system 15. In the embodiment shown, the parts 17 are moved in 90° steps such that they are subjected to a cooling phase at 90° outside the apparatus 1 before the machining on the second processing level 11. Finished parts are removed from the apparatus 1 either at 180°, after the machining in the region of the second processing level 11, or at 270° (cf. FIG. 3). Removal at 270° affords the advantage that the parts to be removed can be subjected to a further cooling phase.

As emerges from FIG. 6, the retaining means 23 have a cross section which is conical toward the second mold half 3 and corresponds to a corresponding cross section of depressions 27 of the second mold half 3 in the region of the first and the second processing levels 10, 11. When the injection molding apparatus 1 is closed, the retaining means 23 are lowered into the depressions 27 where they are locked in place by the closing of the mold 1. The conical cross section serves for centering purposes and also assists the tightness.

The invention claimed is:

1. An apparatus for producing a product comprising:
a first processing level which is formed by a fixed first mold half and a second mold half which is displaceable in a first direction;
a second processing level which is formed by the second mold half and a third mold half which is displaceable in the first direction, wherein the second mold half is of cuboidal design having on two opposite sides cavities;
a transfer system which is attached to the second mold half and which includes several cantilevers to transport parts formed on the first processing level onto the second processing level, wherein each of said cantilevers are fastened to a cantilever arm arranged substantially perpendicular to and rotatable about an axis of rotation, said cantilever arms having an adjustable length in radial direction whereby parts made on the first processing level can be lifted out of a first cavity and brought into a further cavity of the second processing level, wherein
the second mold half is divided into lower and an upper half and the cantilever arms are arranged in a slot-shaped opening between the lower and the upper half;
each cantilever extends across the lower and the upper half and comprises several part retaining means which engage with respect to cavities of the first processing level, or form a region of the cavities; and
wherein the part retaining means include a cross-section that corresponds to a corresponding cross section of depressions of the second mold half, the part retaining means engageable with the cavities so that parts temporarily stick to the part retaining means such that the parts are transported from the first processing level onto the second processing level.

2. The apparatus of claim 1, wherein the axis of rotation of the transfer system is arranged substantially perpendicularly to the first direction.

3. The apparatus of claim 1, wherein the axis of rotation of the transfer system is arranged substantially in the center of the second mold half.

4. The apparatus of claim 1, wherein part retaining means comprise a conical cross-section.

5. The apparatus of claim 1, characterized in that the transfer system comprises four cantilever arms which rotate around the second mold half in 90° steps.

6. The apparatus according to claim 1, wherein each cantilever arm comprise two telescopic rods which are arranged parallel to each other.

7. The apparatus of claim 6, wherein the telescopic rods are adjusted hydraulically, mechanically or electrically.

8. The apparatus of claim 1, wherein the second mold half is supported on the struts of an injection molding machine and is displaceable along them.

9. The apparatus of claim 8, wherein the second mold half includes mold retaining means supporting and mounting on the struts of the injection molding machine.

10. The apparatus of claim 9, wherein the mold retaining means only partially surround the struts.

\* \* \* \* \*